Figure 1:
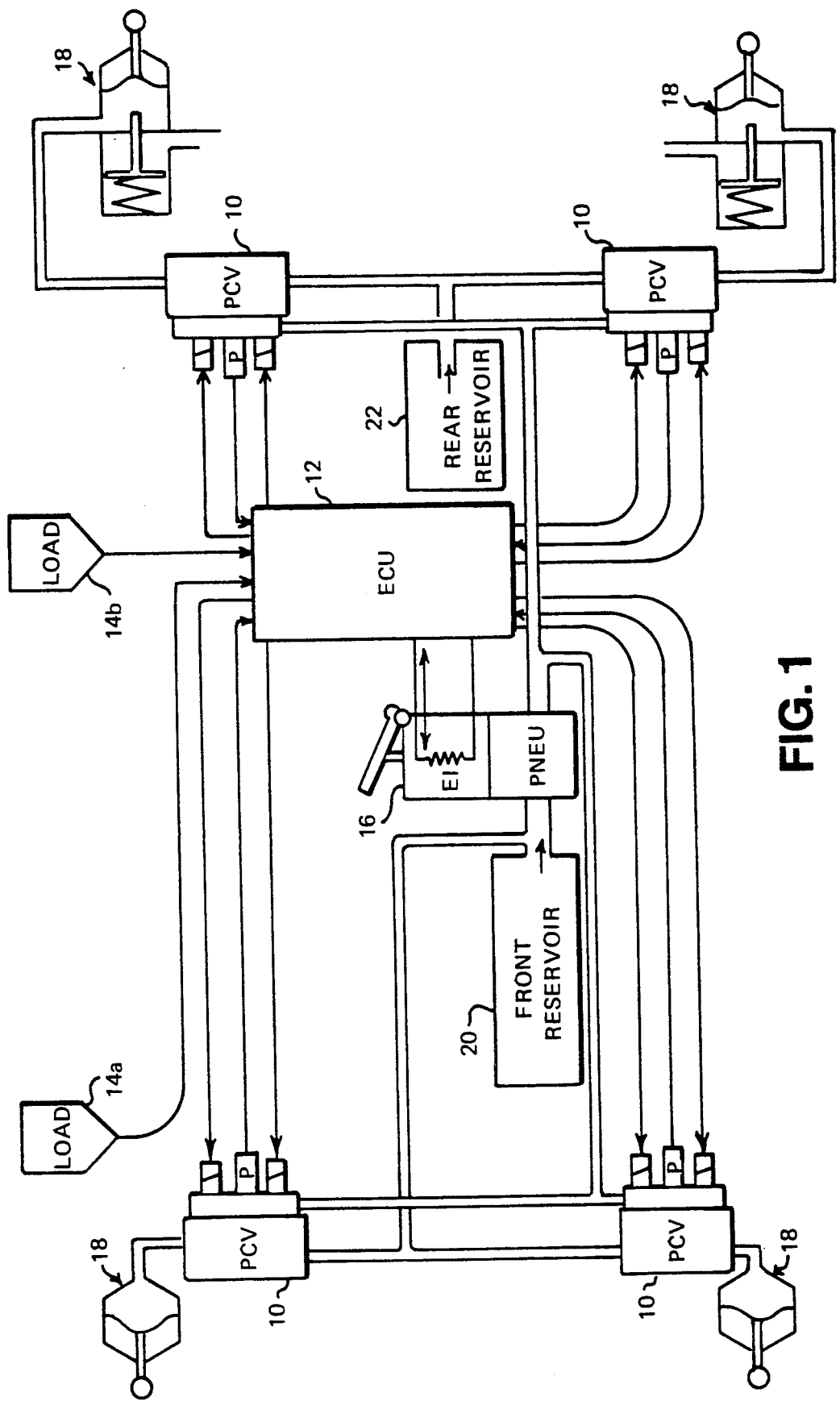

United States Patent [19]

Brearley

[11] Patent Number: 5,328,251
[45] Date of Patent: Jul. 12, 1994

[54] ELECTRONIC BRAKING SYSTEM

[75] Inventor: Malcolm Brearley, West Midlands, England

[73] Assignee: Lucas Industries public limited company, Solihull, England

[21] Appl. No.: 150,234

[22] Filed: Nov. 9, 1993

Related U.S. Application Data

[63] Continuation of Ser. No. 921,113, Jul. 29, 1992, abandoned.

[30] Foreign Application Priority Data

Aug. 6, 1991 [GB] United Kingdom ............... 9116952.4

[51] Int. Cl.$^5$ ............................................. B60T 13/28
[52] U.S. Cl. .......................................... 303/9; 303/16; 303/85
[58] Field of Search .................. 303/9, 15, 16, 17, 20, 303/85, 92, 113.4; 192/1.34, 1.35, 1.37, 1.39

[56] References Cited

U.S. PATENT DOCUMENTS

| 3,880,473 | 4/1975 | Urban et al. ............... 303/9 |
| 4,003,605 | 1/1977 | Fannin ..................... 303/9 X |
| 4,121,873 | 10/1978 | Durling .................... 303/9 X |
| 4,673,222 | 6/1987 | Knight ..................... 303/9 |
| 4,708,406 | 11/1987 | Takagi et al. . |
| 4,792,192 | 12/1988 | Tveitane ................... 303/92 X |
| 4,812,777 | 3/1989 | Shirai . |
| 4,824,178 | 4/1989 | Petersen ................... 303/15 |
| 4,877,294 | 10/1989 | Kuhn et al. ................ 303/9 |

FOREIGN PATENT DOCUMENTS

0387004  3/1990  European Pat. Off. .

Primary Examiner—Robert J. Oberleitner
Assistant Examiner—Lee W. Young
Attorney, Agent, or Firm—Oblon, Spivak, McClelland, Maier & Neustadt

[57] ABSTRACT

An electronic braking system for wheeled vehicles comprising an electronic controller which produces, in response to driver braking demands, electronic signals for controlling the braking pressures applied to the vehicle wheels from a source of braking pressure. The system includes a second, back-up braking pressure source which can be selected when required, and means for switching over from the first-mentioned normal source of braking pressure to the back-up pressure source at selected occasions when the vehicle is being braked and has come to rest, provided that the prevailing driver's braking demand is above a predetermined minimum threshold. A test is then performed on the braking pressure signals generated by the system while it is energized by the back-up source and a warning signal is generated if the back-up source is found to be faulty.

11 Claims, 4 Drawing Sheets

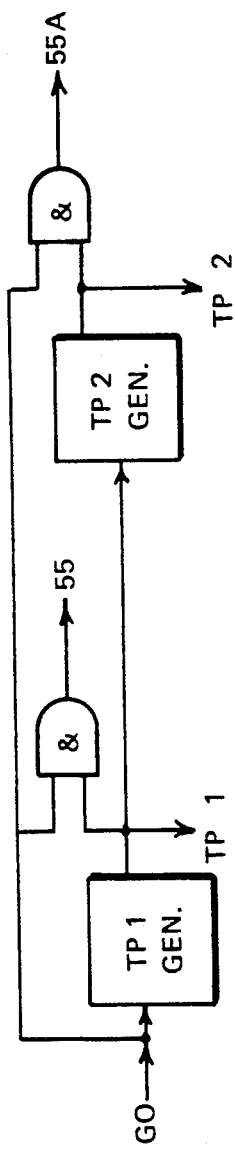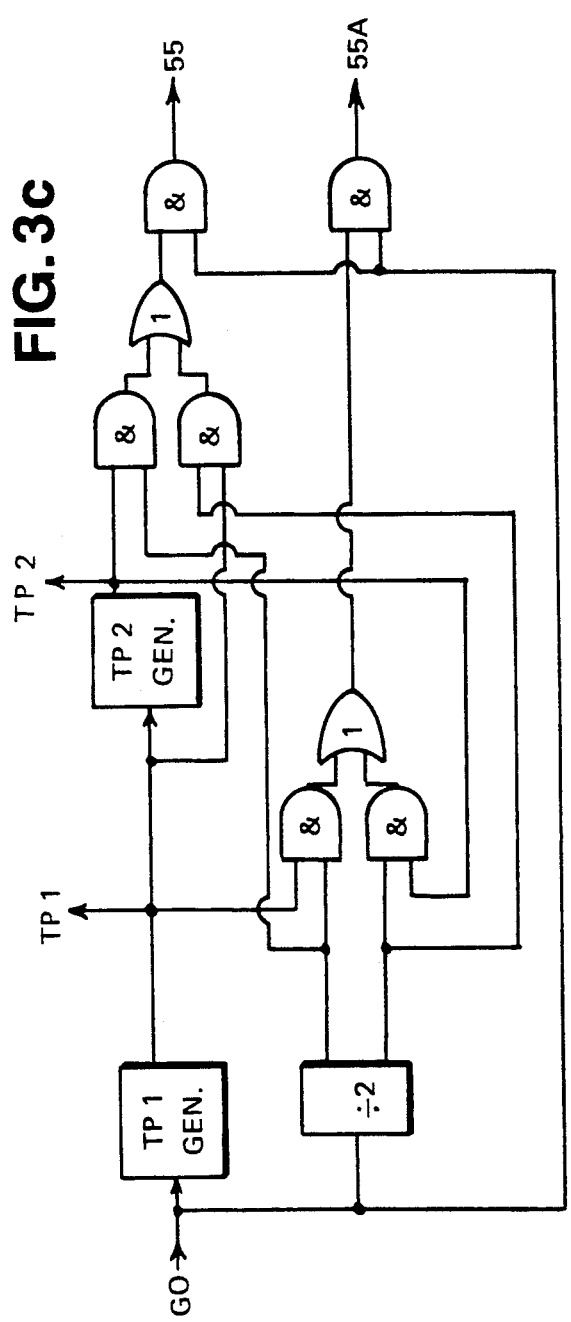

ELECTRONIC BRAKING SYSTEM

This application is a continuation of application Ser. No. 07/921,113, filed on Jul. 29, 1992, now abandoned.

The present invention relates to electronic braking systems (EBS) for wheeled vehicles and is concerned in particular with the monitoring of the pressure control means in such systems.

In an electronic braking system (EBS) typically as described in our European Patent Application Nos. 86303997.0 and 86303998.8 there is provided a braking pressure control means which is itself controlled electronically in relation to the driver's braking demand (established normally by a foot-operated pedal transducer) to set the braking pressures individually for each axle of the vehicle or, in cases where anti-lock control is to be incorporated, individually for each wheel or, on the largest vehicles, some combination of these control levels. The EBS sets and controls braking pressures in response to the driver's demands by the use of one or more pressure control loops.

In such an electronic braking system, braking is applied by the use of standard conventional brakes of disc or drum form which are actuated by braking pressure signals. The braking pressures established by the system are controlled by electronic signals which are produced in an electronic controller in response to driver braking demands, as sensed electronically from the brake pedal and modified in a known manner by other sensors on the vehicle. The braking pressures for the individual wheels or axles are usually developed in respective pressure control valves, the braking pressure levels being monitored continuously by pressure sensors incorporated into each pressure control valve.

In the event of the detection of a fault in the basic pressure control, it is conventional practice to provide a default back-up pressure source which is arranged to be switched in by the electronic controller to replace the normal pressure source and enable the maintenance of selected braking pressures.

It is an object of the present invention to provide a means of testing the operation of the back-up pressure source to ensure that it will be available for use when needed.

In accordance with the present invention, the system is arranged to switch over from the normal pressure source to the back-up pressure source at selected occasions when the vehicle is being braked and has come to rest, provided that the prevailing driver's braking demand is above a predetermined minimum threshold. A test is then performed on the system while it is energized by the back-up source. If the back-up source is found to be faulty, it is disabled and a warning signal is generated.

Preferably, the latter test is made on every occasion that the vehicle is being braked and has come to rest, and the prevailing driver's braking demand is still above said predetermined minimum threshold.

In one embodiment, the changeover can take place as a two-part operation, initially at one axle (normally the front axle) and, when back-up pressure is correctly sensed at that axle, the other axle (or trailer system) pressure changeover then takes place and a further pressure test is made.

In other embodiments, testing of the pressure systems applicable to different axles is made on different qualifying stops of the vehicle. For example, the front axle system is tested on a first qualifying stop and the rear axle on a subsequent qualifying stop, and so on. The particular order and frequency of the tests can be selected, as desired.

Preferably, the pressure test comprises testing that the braking pressure achieved using the back-up pressure source is within predetermined limits of the measured driver's braking demand.

Figure 2:
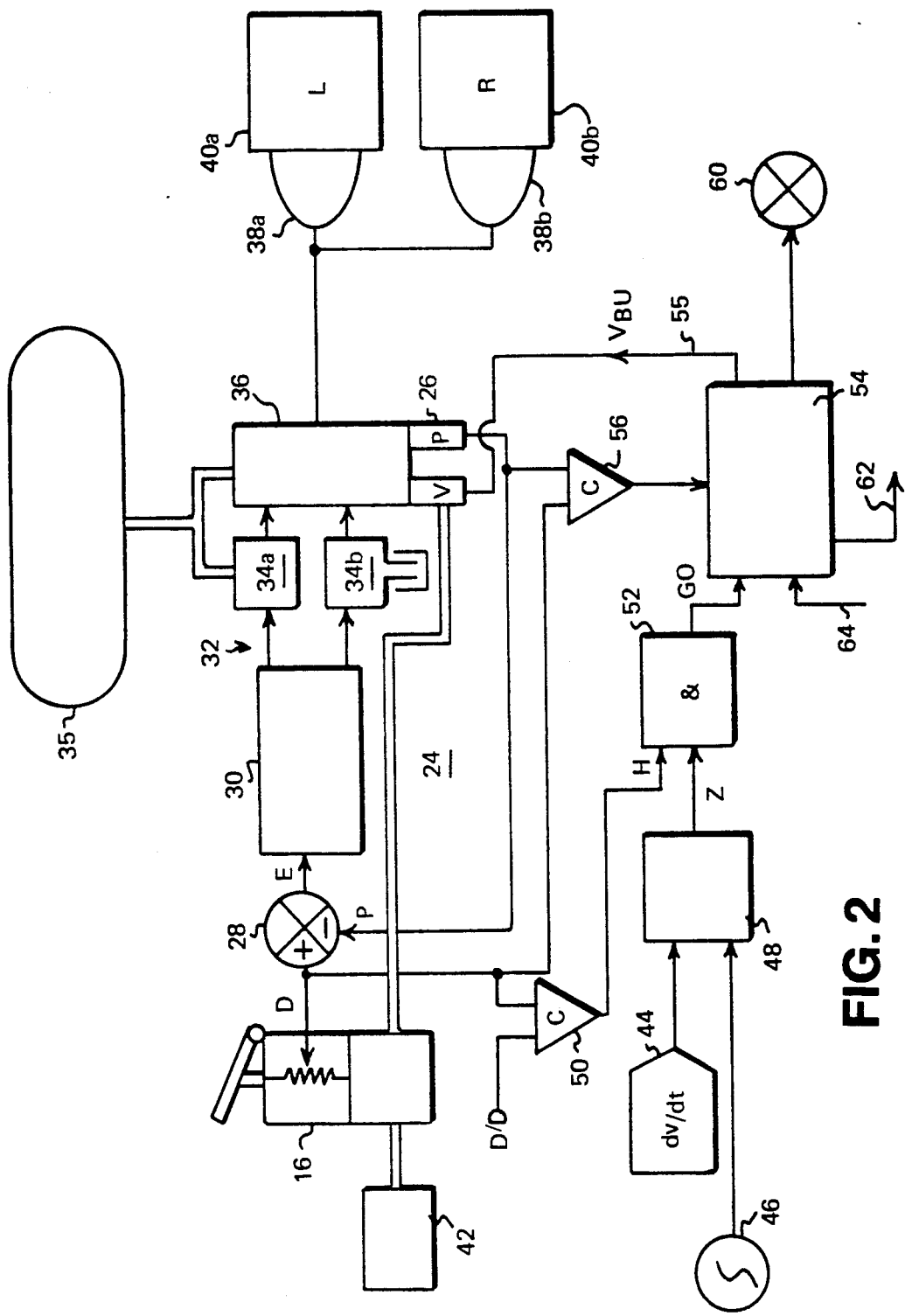

The invention is described further hereinafter, by way of example only, with reference to the accompanying drawings, in which:

FIG. 1 is a diagrammatic representation of one embodiment of an EBS to which the present invention is applicable; and FIG. 2 is a block circuit diagram of one possible embodiment of a default back-up pressure source monitoring system in accordance with the present invention; and FIGS. 3a–3d are various possible formats for component sections of the backup switch and monitor unit of the embodiment of FIGS. 1 and 2.

FIG. 1 shows a four channel EPB (Electro-Pneumatic-Braking) system in which braking pressures are developed at individual pressure control valves 10 which take inputs from front and rear axle pressure reservoirs 20,22, back-up pressure braking signals and electronic control signals produced by an electronic controller 12. The braking pressure levels are continuously monitored by pressure sensors incorporated into each pressure control valve.

The electronic controller 12 can select the electronically controlled pressure source or a default back-up pressure source and each one, when selected, is monitored by the pressure sensors in the appropriate valve.

As shown in FIG. 1 the electronic controller 12 receives axle load signals from front and rear axle load sensors 14a, 14b, these axle load signals being used to modify the braking demand signals established by a foot pedal transducer arrangement 16. Individual brake actuators 18 at the (four) wheels apply the brakes when pressurised. The front and rear pressure reservoirs are indicated at 20,22 respectively. It is conventional practice for the default pressure source for each axle to comprise the other one of the front and rear reservoirs when one is detected to be faulty. That is, if the rear reservoir 22 is found to be faulty, then the front reservoir is used to supply both front and rear axles and vice versa. Alternatively, a further separate default reservoir (not shown) could be provided.

Referring now to FIG. 2, there is shown in more detail a conventional pressure control loop for a typical EBS to which one embodiment of the present invention has been applied. The foot pedal transducer 16 generates a first signal indicating the braking level desired by the driver. The sensors 14a,14b measure the vehicle axle loads and a further sensor (not shown), the operating gradient. In accordance with known techniques described fully in earlier European Patents of the Applicants, the system makes appropriate open loop corrections to the brake pressure demands being interpreted from the driver pedal input with the aim of restoring the vehicle deceleration to be fixed in proportion to the driver's demand.

The brake pedal transducer 16 provides an input D to a pressure control loop 24 which generates a pressure error signal E by comparison in an adder/subtracter 28 of the demand signal D with the output P of a pressure transducer 26. The pressure error E forms the input to a pressure controller 30 which generates an output signal which causes the pressure developed by an electropneumatic converter 32 to change in a direction such as to reduce the amplitude of the pressure error E. Pneumatic pressure medium is stored in a reservoir 35 (which would be one of the reservoirs 20,22 of FIG. 1).

The nature and circuit of such a pressure controller 30 depends upon the type of converter 32 employed. Two such converter principles are well known, namely an analogue system in which a valve is employed with pressure output developed proportional to solenoid current and a digital system, as shown in FIG. 2, in which a pair of simpler solenoid valves 34a, 34b is employed to raise or lower a control chamber pressure by selective energisation. One form of pneumatic converter employs a relay valve 36 which responds to this control chamber pressure and which re-balances into the closed condition when the brake pressures at actuators 38a, 38b for the brakes 40a, 40b (left and right) of the vehicle become equal to this control pressure. Such a valve 36 has an advantage in that the control chamber pressure responds rapidly to valve opening, giving a fast control loop which is accurate and responsive.

Normally an actual system would employ separate control loops 24 for each axle or for each wheel to be braked, supplied with brake pressure demands D by a common brake pedal transducer 16. In this way, the various axles or wheels can be supplied with different pressure signals, as the conditions demand.

At initial start-up in such systems, it is known already from our GB 8905311 to apply automatically a precise cycle of braking pressure so as to test the operation of the electronically controlled pressure system, or systems. This is achieved without any driver input or involvement other than switching on.

The present system of FIG. 2 performs additional regular tests on the performance of the back-up pressure system to ensure that it will be available when needed. In the embodiment of FIG. 2, this is achieved by switching over to the back-up pressure source on each occasion where the vehicle is being braked and has to come to rest, provided that prevailing brake demand is above a certain minimum threshold. Thus, whilst the vehicle is decelerating, the main controlled source 35 of braking pressure is applied but, as soon as the vehicle achieves standstill, the pressure source is changed over temporarily to a back-up source 42 so that the latter source can be tested. Optionally, this change over takes place as a two part operation, initially at, say, the front axle and, when the back-up pressure is correctly sensed at that axle, the other axle or trailer system pressure change over takes place. This prevents a back-up fault causing more than a half system braking loss, as a result of the test.

As shown diagrammatically in FIG. 2, when a vehicle equipped with this system is being braked, the vehicle deceleration is monitored by a sensor 44 and the vehicle speed by a sensor 46. Compensation can be made for the vehicle being braked on a gradient using a deceleration/distance/time calculation to ensure that the vehicle will have truly stopped, in spite of possible wheel lock. Finally, an output Z is issued by a zero speed detector 48 when zero speed has been detected or judged. At the same time, the driver's demand signal D is compared in a comparator 50 against a preset minimum threshold D'. If the driver's demand D is sufficiently high, the comparator 50 issues a signal H which is entered with the zero speed detect signal Z to an AND gate 52. In the presence of both of signals H and Z at its inputs, the AND gate 52 provides a control signal GO that instructs a backup switch and monitor unit 54 to issue a signal VBU on a line 55 which is arranged to switch the control valve 36 from the EPB control system energized by the reservoir 35 to the backup braking system energized by the backup source 42. When this switch has been made, the backup pressure P is measured and compared against the driver's demand output D from the pedal transducer 16 in a further comparator 56. If the backup pressure P derived using the source 42 is found to differ from the driver's demand by a predetermined amount as measured at the comparator 56, then the backup switch and monitor 54 is arranged to disable the backup system, reverts to EPB control and issues a warning signal to the driver by means, for example, of a warning light 60. Otherwise, if the backup system is found to be operating correctly, a signal is issued by a line 62 to apply backup to the other axle. The response of the other axle is monitored by way of a further line 64.

The backup switch and monitor 54 has five main functions in the described embodiment:

a) Accept a GO signal and select the axle to backup test;

b) issue backup solenoid drive signal $V_{BU}$ on line 55;

c) Monitor and store test results of backup pressure;

d) Accept the result from the other axle during test of that axle; and e) Warn of fault if backup test result shows a "failure".

The backup test organisation is now briefly described.

There is preferably only one backup test control circuit 54 and this is part of the master controller 12. This provides the solenoid drive signals and monitors both pressure sensing results. Preferably only one axle is tested at a time but there are at least three other possible alternatives, namely:

a) Front axle tested after first qualifying stop, then rear axle after next qualifying stop, then alternate.

b) Front axle tested first after each qualifying stop then rear axle, either in addition to front or instead of front.

c) As (b), first axle to be tested changes over at each qualifying stop i.e. front then rear . . . rear then front . . .

The Backup Switch and Monitor 54 has the logic to control the tests as above by releasing the appropriate backup valves (normally energized) and simultaneously monitoring the control valve pressure responses, storing said responses and issuing a fault condition if appropriate, thus lighting the warning lamp 60.

Although FIG. 2 shows only the generation of $V_{BU}$ drive signals 55 for one axle (say the front) by the backup switch and monitor 54, in practice it would also generate $V_{BU}$ drive signals (55a) for the other (rear) axle. These signals are generated individually and cause selective release of the backup solenoid valve on each axle so as to provide a test of axies sequentially as opposed to simultaneously. Under the backup conditions set by a GO signal from circuit element 52 and for the duration of this signal, a test for each axle in turn is initiated. During the backup period, braking on that axle is switched over to wholly pneumatic source and brake pressure is compared with the pedal demand, which is set from the pedal electrical output or from a pressure sensor on the pneumatic signal line 24. This is not an exacting comparison as some difference in pressure is expected to occur between the pneumatic control and the electronic control but comparator 56 has practical limits set on an error level of acceptability which ensures an adequate test. Output signal 56' or 56" (for the rear axle) from the comparator 56 indicates an error which is taken as in input to the fault detection circuit within block 54.

Figure 3A:
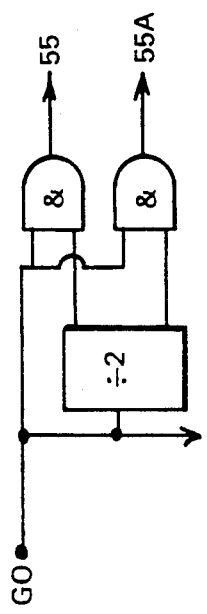

As mentioned hereinbefore, a number of possibilities for backup testing are possible within the block 54 and three typical examples are illustrated in FIGS. 3a, 3b and 3c. the operating schedules in these typical examples are respectively:

(a) Only one axle is tested at the end of each qualifying stop, alternating between front and rear axles.

(b) On each qualifying stop, as the vehicle comes to rest, the front axle is tested for e.g. 1 second and then the rear axle is tested for 1 second. Because the GO signal is removed if the driver demand on the brakes is removed, arrangement (b) favours front axle testing so that equality of testing is improved in alternative (c).

(c) In this case the sequence of test pulses is switched over at each qualifying stop, giving front axle then rear axle tests on one stop and rear axle then front axle on the next stop.

In all cases, the axle error signals 56' and 56" are, for the duration of each test, connected via a selector to a fault memory which is caused to set and light the fault indicator for the duration of this and subsequent signals. Test pulse generators TP1 and TP2 control the periods of switch-over to the pneumatic backup source and are fed via DELAY-ON circuits into the error selector which feeds the SET inputs of the fault memory, to prevent transient errors associated with the changeover causing any erroneous indication of fault conditions. This causes the error registration process to start after any transient in the brake pressure lines have settled down.

FIG. 3a shows a simple circuit which has a single stage (÷2) counter which toggles at each new GO signal, changing over the drive signals to the two AND gates which provide signal 55 on one stop and signal 55a on the next, as required for schedule (a).

FIG. 3b is a block diagram of a circuit which provides two sequential signals at the end of each qualifying stop. These are test pulse 1 and subsequent test pulse 2, typically of 1 to 2 seconds duration each. Signals 55 and 55a are produced for the duration of these pulses TP1 and TP2 respectively, provided that the GO signal is maintained i.e. the driver does not release the brake pedal.

FIG. 3c uses the same layout as FIG. 3(b) which generates schedule (b) with additional counter circuit and test pulse TP1 or TP2 selectors to switch over the sequence on each stop as required for schedule (c). The state of the ÷2 counter stage selects TP1 to give 55 and TP2 to give 55a and vice versa on the next qualifying stop, with the pulses being terminated if the GO signal is removed.

Figure 3D:
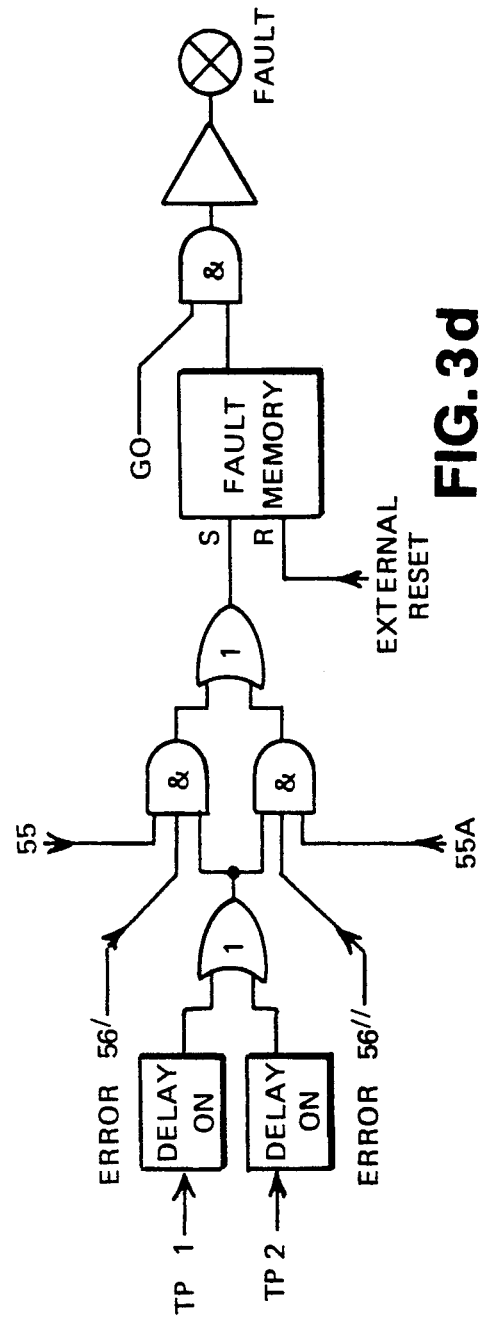

FIG. 3d shows a fault circuit which looks for an error signal from each axle during the latter part of the corresponding test signal and, if present, causes the fault memory to set and light the lamp. In the simple case of FIG. 3a, the GO signal forms the test pulse and provides an input in place of TP1 to open the appropriate AND gates which accept error signals 56 or 56a. The fault memory is shown with the simplest reset condition from an external test equipment source used in faults finding.

I claim:

1. An electronic braking system for wheeled vehicles comprising:
   first means for generating first electrical signals responsive to driver braking demands;
   a main source of braking pressure;
   a source of back-up braking pressure;
   an electronic controller which produces, in response to driver braking demands established via said first means, second electronic signals for controlling the braking pressures applied to the vehicle wheels from said main source of braking pressure;
   second means for establishing whether the vehicle is being braked and has come to rest;
   third means for establishing whether the prevailing driver's braking demand is above a predetermined threshold;
   fourth means for switching over from said main source of braking pressure to said back-up pressure source at selected occasions when it is determined by said second means that the vehicle is being braked and has come to rest, provided that it is also determined by said third means that the prevailing driver's braking demand is above said predetermined threshold; and
   fifth means for then performing a test on the braking pressures generated by the braking system while it is energized by the back-up source and generating a warning signal if the back-up source is found to be faulty.

2. An electronic braking system according to claim 1, wherein said second means comprises:
   a vehicle speed sensor;
   a vehicle deceleration sensor; and means for providing a signal (Z) indicative of the condition that the vehicle has zero velocity;
   and wherein said third means comprises a comparison means for providing a signal (H) indicative of driver's demand being greater than a predetermined threshold;
   and wherein said fourth means provides a test initiation signal (GO) only when the signals (Z) and (H) are present.

3. An electronic braking system according to claim 2, wherein said fifth means comprises:
   means for generating a back-up select signal and cause said back-up source to be selected on receipt of said test initiation signal;
   means for receiving and monitoring the back-up pressures generated when the system is energized by said back-up pressure source; and
   means for providing a warning signal if the back-up test result is below a predetermined performance.

4. An electronic braking system according to claim 1, wherein said second means comprises vehicle speed and deceleration sensors and a zero speed detector which responds to inputs from said speed and deceleration sensors to provide a vehicle stationary signal (Z) when the vehicle has been determined to have come to rest.

5. An electronic braking system according to claim 1, including means for effecting the switching over from said main source to the back-up pressure source as a two-part operation, initially at one axle and, when back-up pressure is correctly sensed at that axle, pressure switching over at another axle then takes place and a further pressure test is made.

6. A method of testing the operation of a back-up pressure source in an electronic braking system for wheeled vehicles which has an electronic controller for producing, in response to driver braking demands, electronic signals for controlling the braking pressures applied to the vehicle wheels from a main source of braking pressure, the system having a second, back-up source of braking pressure which can be selected when required, said method comprising:

generating, in response to said driver braking demands, said electronic signals for controlling the braking pressure applied to the vehicle wheels from said main source of braking pressure;

establishing whether the vehicle is being braked and has come to rest;

establishing whether the prevailing driver's braking demand is above a predetermined threshold;

switching over from said main source of braking pressure to said back-up pressure source at selected occasions when it is has been determined that the vehicle is being braked and has come to rest, provided that the prevailing driver's braking demand is above said predetermined threshold; and performing a test on the braking pressures generated by the braking system while it is energized by the back-up source, and generating a warning signal if the back-up source is found to be faulty.

7. A method according to claim 6, including making the test on every occasion that the vehicle is being braked and has come to rest, and the prevailing driver's braking demands is determined still to be above said predetermined minimum threshold.

8. A method according to claim 6, comprising performing said switching over as a two-part operation, initially switching over from said main source to said back-up source at one axle and, when back-up pressure has been correctly sensed at that axle, switching over from said main source to said back-up source at another axle and making a further pressure test.

9. A method according to claim 6, comprising testing the pressure systems applicable to different axles on different qualifying stops of the vehicle.

10. A method according to claim 9, comprising testing a front axle system on a first qualifying stop, alternately testing a rear axle on a subsequent qualifying stop, and thereafter repeating the alternate testing of said axles.

11. A method according to claim 6, comprising testing that the braking pressure achieved using the back-up pressure source is within predetermined limits of the measured driver's braking demand.

* * * * *